(12) United States Patent
Wang et al.

(10) Patent No.: US 6,744,505 B1
(45) Date of Patent: Jun. 1, 2004

(54) COMPACT IMAGING SPECTROMETER

(75) Inventors: David Y. Wang, Fremont, CA (US); David M. Aikens, Chester, CT (US)

(73) Assignee: Therma-Wave, Inc., Fremont, CA (US)

( * ) Notice: Subject to any disclaimer, the term of this patent is extended or adjusted under 35 U.S.C. 154(b) by 23 days.

(21) Appl. No.: 10/208,323

(22) Filed: Jul. 30, 2002

Related U.S. Application Data

(60) Provisional application No. 60/317,687, filed on Sep. 6, 2001.

(51) Int. Cl.[7] .............................. G01J 3/14; G01J 3/18; G01J 3/28
(52) U.S. Cl. ........................................ 356/326; 356/328
(58) Field of Search ................................. 356/305, 326, 356/328, 331, 334

(56) References Cited

U.S. PATENT DOCUMENTS

| | | | |
|---|---|---|---|
| 5,384,656 A | * 1/1995 | Schwenker | 356/328 |
| 5,910,842 A | 6/1999 | Piwonka-Corle et al. | 356/369 |
| 6,278,519 B1 | 8/2001 | Rosencwaig et al. | 356/369 |

* cited by examiner

Primary Examiner—F. L. Evans
(74) Attorney, Agent, or Firm—Stallman & Pollock LLP

(57) ABSTRACT

The subject invention relates to the design of a compact imaging spectrometer for use in thin film measurement and general spectroscopic applications. The spectrometer includes only two elements, a rotationally symmetric aspheric reflector and a plane grating. When employed in a pupil centric geometry the spectrometer has no coma or image distortion. Both spherical aberration and astigmatism can be independently corrected. The invention is broadly applicable to the field of optical metrology, particularly optical metrology tools for performing measurements of patterned thin films on semiconductor integrated circuits

17 Claims, 8 Drawing Sheets

COMPACT IMAGING SPECTROMETER

PRIORITY CLAIM:

The present application claims priority to U.S. Provisional Patent Application Serial No. 60/317,687, filed Sep. 6, 2001, which is incorporated herein by reference.

TECHNICAL FIELD

The subject invention relates to the design of a broadband imaging spectrometer for use in thin film measurement and general spectroscopic applications. The invention is broadly applicable to the field of optical metrology, particularly optical metrology tools for performing measurements of patterned thin films on semiconductor integrated circuits.

BACKGROUND OF THE INVENTION

The use of thin film measurement technologies such as spectroscopic ellipsometry [SE], broadband reflectometry [BBR] and visible light reflectometry [VR] is well established. These technologies typically use a spectrometer to simultaneously gather information about the sample under test at different wavelengths. Examples in the prior art include U.S. Pat. No. 6,278,519 and U.S. Pat. No. 5,910,842 incorporated herein by reference. For optical wafer metrology the wavelength region of interest spans the vacuum ultra-violet [VUV] and near infrared [NIR].

Ideally the spectrometer has the following characteristics:
a) High efficiency over the desired wavelength range. This implies large dynamic range and high wafer throughput. This may permit low power light sources to be used reducing thermal loading of the optical system permitting a simplified design for the thermal management system and the optical mounts. All of these effects combine to improve metrology system performance at reduced cost of ownership.
b) Low spatial distortion. This implies that the detected light comes to sharp focus and forms a small spot size on the detector. Low spatial distortion implies good chromatic separation. This in turn helps minimize "cross-talk" between detected wavelengths and improves the accuracy and resolution of the spectrometer.
c) Low chromatic distortion. Low chromatic distortion implies the spot size is consistently small over the desired wavelength range typically from VUV to IR. This minimizes the potential for "cross-talk" between detected wavelengths and improves the accuracy and resolution of the spectrometer.
d) Low scatter. Scatter modifies the spatial dependence of the optical intensity striking the detector. Light is removed from one spectrally separated channel (channel A) and is, potentially, deposited into an adjacent channel (channel B). This artificially reduces the channel A signal and artificially increases the channel B signal. This acts to wash-out the chromatic separation and produces measurement error.
e) The spectrometer design should employ a small number of individual components that are maintained in a robust arrangement that is easy to align optically. This insures high performance, simplifies fabrication, minimizes required maintenance and reduces capital costs.

It is a challenge to design a spectrometer that meets all of these requirements. There are three notable prior art spectrometer designs that do not meet all of the above listed requirements but satisfactorily address at least a subset of the requirements.

The simplest of the prior art designs forms the spectrometer with a single element. The most common implementation employs holographic techniques to form the grating on a concave, usually spherical, surface. In these systems the grating has two functions since it focuses and diffracts the incident light. Since the design has a single element it is relatively easy to align. But, the design suffers from high spatial and chromatic distortions over the wavelength range of VUV to IR.

FIG. 1 illustrates another prior art design, the Fastie-Ebert spectrometer 40 that uses two elements, one large spherical mirror 30 and one plane diffraction grating 32 to focus and disperse the light. Different portions of the mirror 30 are used to (1) reflect and collimate light entering the spectrometer onto the plane grating and (2) focus the dispersed light, diffracted from the grating, into chromatically separated images of the entrance slit in the spectrometer exit plane. It is an inexpensive and commonly used design, but exhibits limited ability to maintain off-axis image quality due to system aberrations including spherical aberration, coma, astigmatism, and a curved focal field.

FIG. 2 illustrates another prior-art design, the Czemy-Turner (CZ) spectrometer 50, that is an improvement over the Fastie-Ebert design. The CZ spectrometer employs three elements, two concave mirrors, 33 and 35, and a single plane diffraction grating 32. The two mirrors function in the same separate capacities as the single spherical mirror of the Fastie-Ebert configuration, i.e., mirror 33 collimates and reflects light entering the spectrometer onto the diffraction grating 32, and mirror 35 focuses the dispersed light diffracted from the grating into chromatically separated images of the entrance slit in the spectrometer exit plane, but the geometry of the mirrors in the Czerny-Turner configuration is flexible. By using an asymmetrical geometry, the Czemy-Turner configuration may be designed to produce a flattened spectral field and good coma correction at a single wavelength. However, spherical aberration and astigmatism will remain at all wavelengths. The design has the further advantage that it can accommodate very large optics.

Each of the three elements in the Czemy-Turner spectrometer must be aligned precisely. In designs that utilize off-axis aspheric mirrors, alignment can be a daunting task. Furthermore, conventional optical fabrication methods cannot be used to fabricate off-axis aspherics. More complex and less robust optical fabrication techniques must be employed which can both increase fabrication costs and reduce performance. For example, diamond turning as the preferred method for manufacturing off-axis aspherics. Diamond turned optics exhibit higher optical scatter than conventionally figured surfaces.

Accordingly it would be desirable to provide a compact spectrometer employing the minimum number of elements exhibiting low optical scatter, reduced spatial distortion and reduced chromatic distortion over the wavelength range spanning the VUV-NIR.

SUMMARY OF THE INVENTION

A design for a compact imaging spectrometer for use in thin film metrology and general spectroscopic applications is described. In comparison to prior art designs the spectrometer has reduced spherical aberration, coma and astigmatism. The spectrometer includes an entrance aperture arranged to receive light, a wavelength dispersive element, a single, axially rotationally symmetric, aspheric mirror, a detector and a processor. The use of an aspheric mirror permits the correction of spherical aberration. Coma is corrected by system symmetry. The plane of the detector may be tilted to substantially compensate for residual astigmatism.

Diamond turning is a popular method for fabricating off-axis aspheric surfaces. However, unwanted surface features generated in the diamond turning process limit the optical performance of diamond turned optics. Axially rotationally symmetric aspheres, however, can be fabricated using conventional optical polishing techniques. These techniques produce low scatter surfaces at lower cost than diamond turning. Consequently, the spectrometer of the present invention offers enhanced optical performance at reduced cost.

DETAILED DESCRIPTION OF THE PREFERRED EMBODIMENTS

Figure 3:
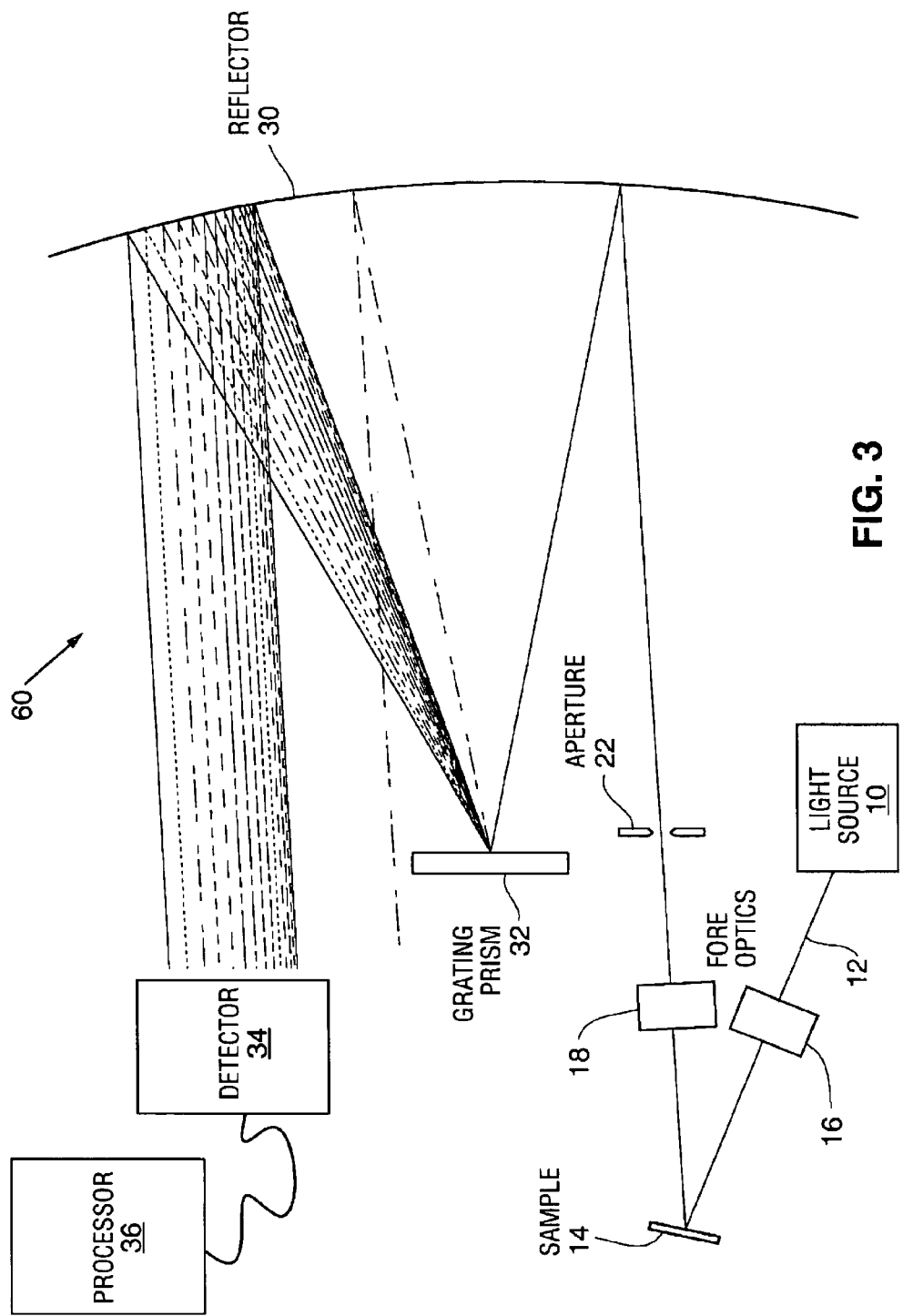
FIG. 3 is a schematic diagram of a generalized spectroscopic optical metrology system incorporating the inventive compact imaging spectrometer.

FIG. 3 illustrates a generalized spectroscopic optical metrology tool 60 incorporating the compact imaging spectrometer. Tool 60 comprises a broadband light source 10 creating a probe beam 12. Fore-optics system 16 focuses and images beam 12 onto the sample 14. The beam interacts with and reflects from the sample. A portion of the reflected beam is collected and focused onto the spectrometer entrance aperture 22 by fore-optics system 18.

The spectrometer includes a reflective optic, mirror 30, and a wavelength dispersive element 32. Mirror 30 has reflective focusing power. Wavelength dispersive element 32 may be a grating, a prism or the equivalent.

Light transmitted through aperture 22 strikes a first portion of mirror 30 that collimates the light and redirects it toward wavelength dispersive element 32. Wavelength dispersive element 32 disperses the light and redirects it toward a second portion of mirror 30. The second portion of mirror 30 reflects and focuses the wavelength-dispersed light to form chromatically separated images of entrance aperture 22 at the exit plane of the spectrometer. Detector 34, located at a position substantially coincident with the spectrometer exit plane, generates output signals in response to the intensity of the chromatically separated images of the entrance aperture 22. In the preferred embodiment detector 34 is a photodiode or CCD array detector. Processor 36 records and analyzes the detector output signals.

Note that a highly simplified optical representation has been employed in FIG. 3. In particular, light source 10 and fore-optic systems 16 and 18 and wavelength dispersive element 32 and detector 34 may be, in practice, extremely complicated optical assemblies. For example, in one preferred embodiment light source 10 is a broadband multiple wavelength light source that may include one or more broad-band continuum sources including NIR, visible, UV, DUV and VUV lamps. Alternatively, light source 10 could comprise a multi-wavelength, non-continuum source that combines the outputs of a plurality of lasers.

Similarly, fore-optics systems 16 and 18 may be complicated broadband optical systems that consist of multiple elements arranged in multiple groups. Wavelength dispersive element 32 may be a plane grating, a prism or a grating that is designed to impart pre-determined wavelength dependence to the diffracted intensity. In this latter case, the regions of differing diffraction properties are preferably made concentric with each other. Detector 34 may incorporate multiple detector elements and wavelength selective optical components including diffractive elements and dichroic mirrors to provide additional spectral separation and enhanced detection of the chromatically separated beam. Further, fiber optic arrays or micro-channel plates can be used to collect, discretize, and transport the imaged light to a remote detector or multiple detectors.

It is important to note that, by achieving all five of the design criteria listed above, configurations can be chosen which will allow the spectrometer to be used in an imaging capacity as well, with the axis perpendicular to the wavelength dispersive axis containing spatial imaging information.

In the preferred embodiment, the compact imaging spectrometer functions to relay light from the spectrometer entrance aperture 22 to the detector 34 and to separate the broadband light into a spectrum over the desired wavelength range. Further, although other arrangements are possible, the spectrometer entrance aperture 22 and the detector 34 are displaced laterally on opposite sides of wavelength dispersive element 32 in a direction perpendicular to the axis of the spectrometer entrance aperture.

Further, the fore-optics systems 16 and 18 are substantially achromatic over the desired wavelength range, telecentric, and are constructed and arranged such that the image is substantially flat at the imaging location. Ideally, the fore-optics systems 16 and 18 combine to transport the illumination reflected from the sample and tightly focus the reflected illumination at the spectrometer entrance aperture 22. The detector 34 may be at any orientation but is preferably oriented such that the incident illumination strikes the detector at near-normal incidence.

Note that FIG. 3 represents a generalized optical metrology tool. The precise form and function of the instrument are determined by the design and arrangement of the fore-optics systems 16 and 18 with respect to the sample 14. The systems could comprise one or more instruments selected from the group consisting of spectroscopic reflectometers, spectroscopic ellipsometers, polarized beam spectroscopic reflectometers, spectroscopic scatterometers or optical CD metrology tools.

In the following we illustrate the predicted wavefront errors for three different spectrometer designs: The Fastie-Ebert spectrometer 40 of FIG. 1, and two different preferred embodiments 70 and 80 of the present invention illustrated in FIG. 5 and FIG. 7 respectively. All of the simulations used a source wavelength of 670 nm, a source NA=0.1, unit magnification (the object is ~100 mm before mirror and the image is ~100 mm after mirror) and a concave mirror with a surface radius ≈200 mm. The grating and mirror positions were adjusted to produce the best focus.

Figure 1:
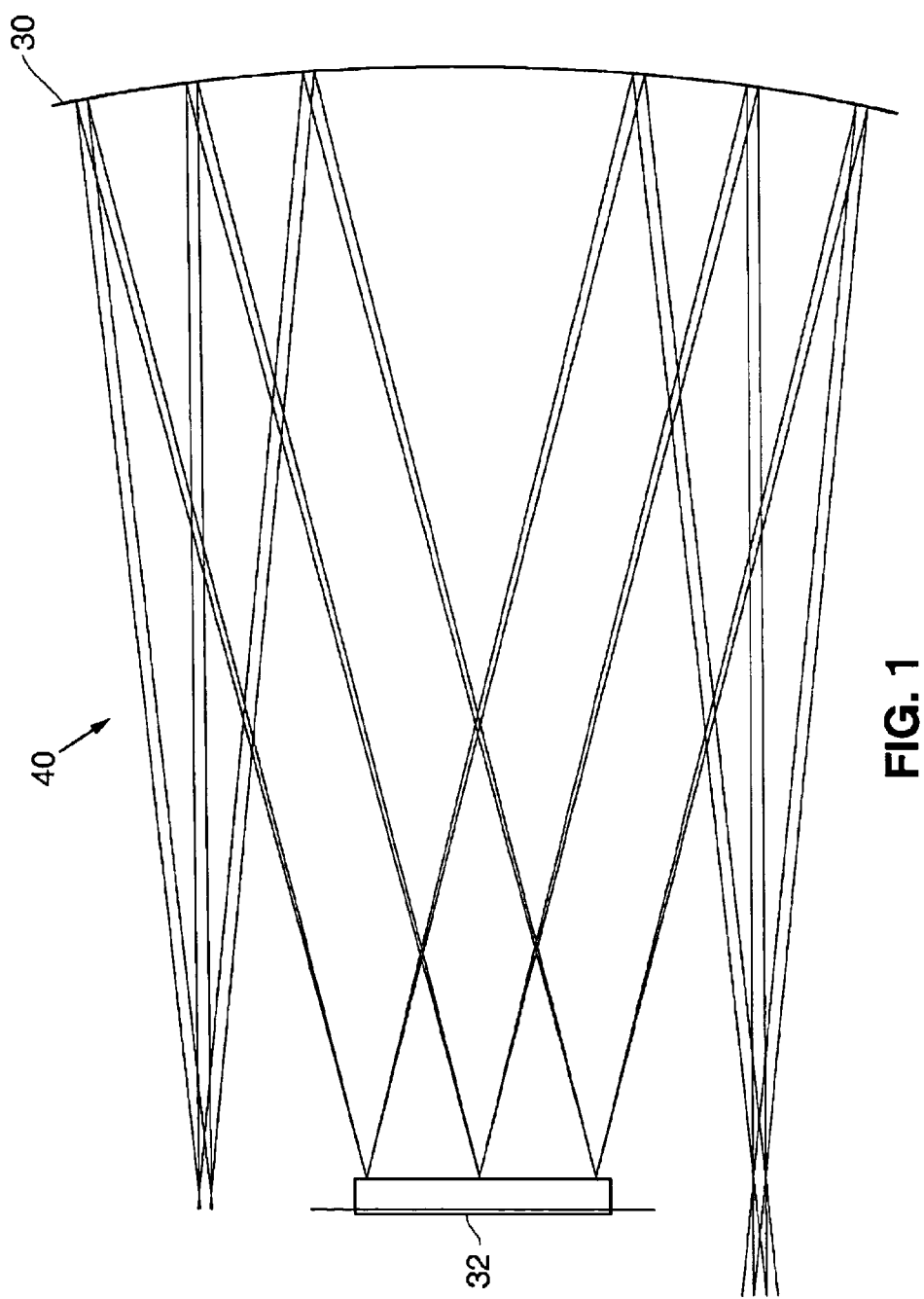
FIG. 1 is a diagram of a prior-art Fastie-Ebert spectrometer.
Figure 2:
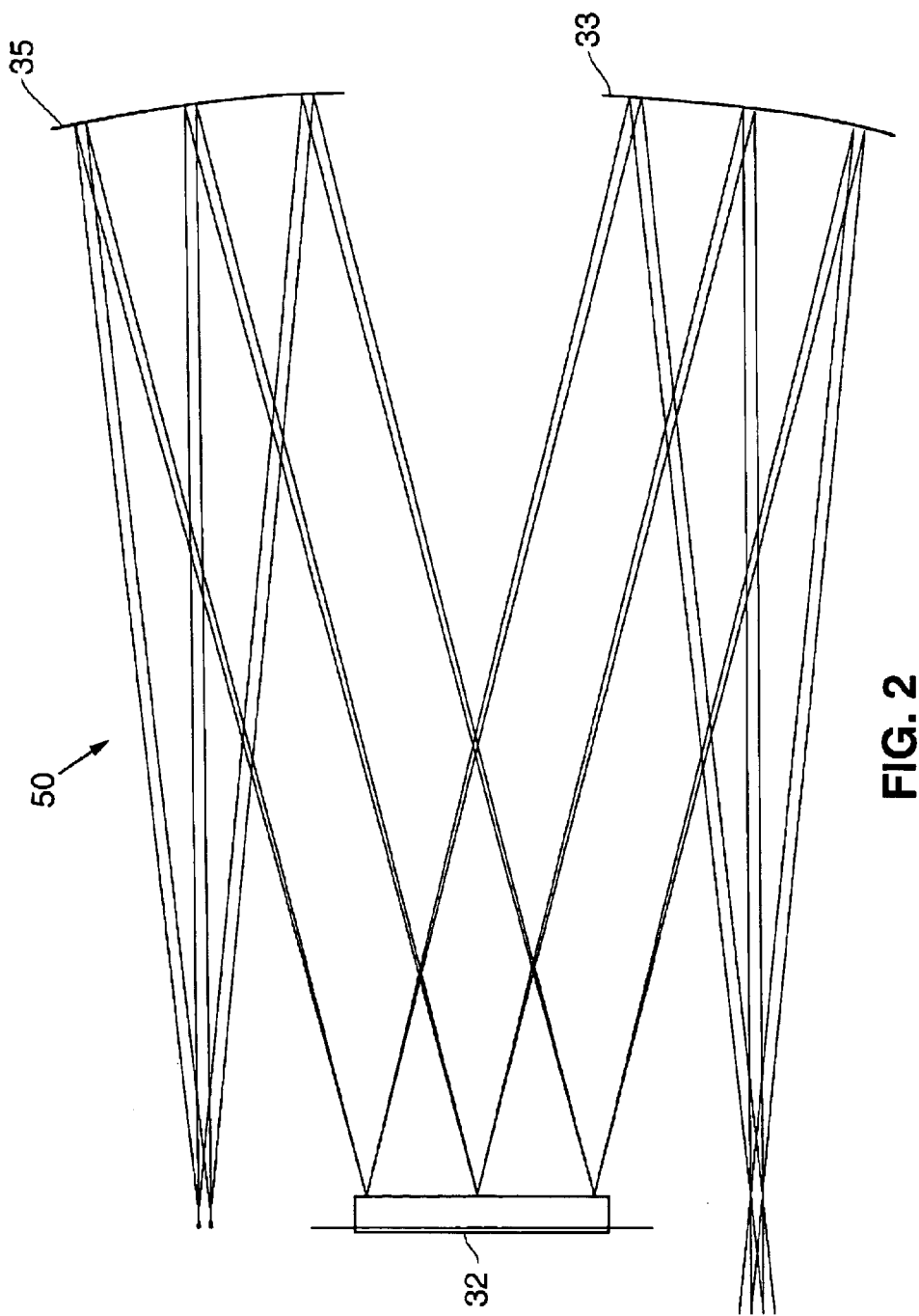
FIG. 2 is a diagram of a prior art Czerny—Turner spectrometer.
Figure 4:
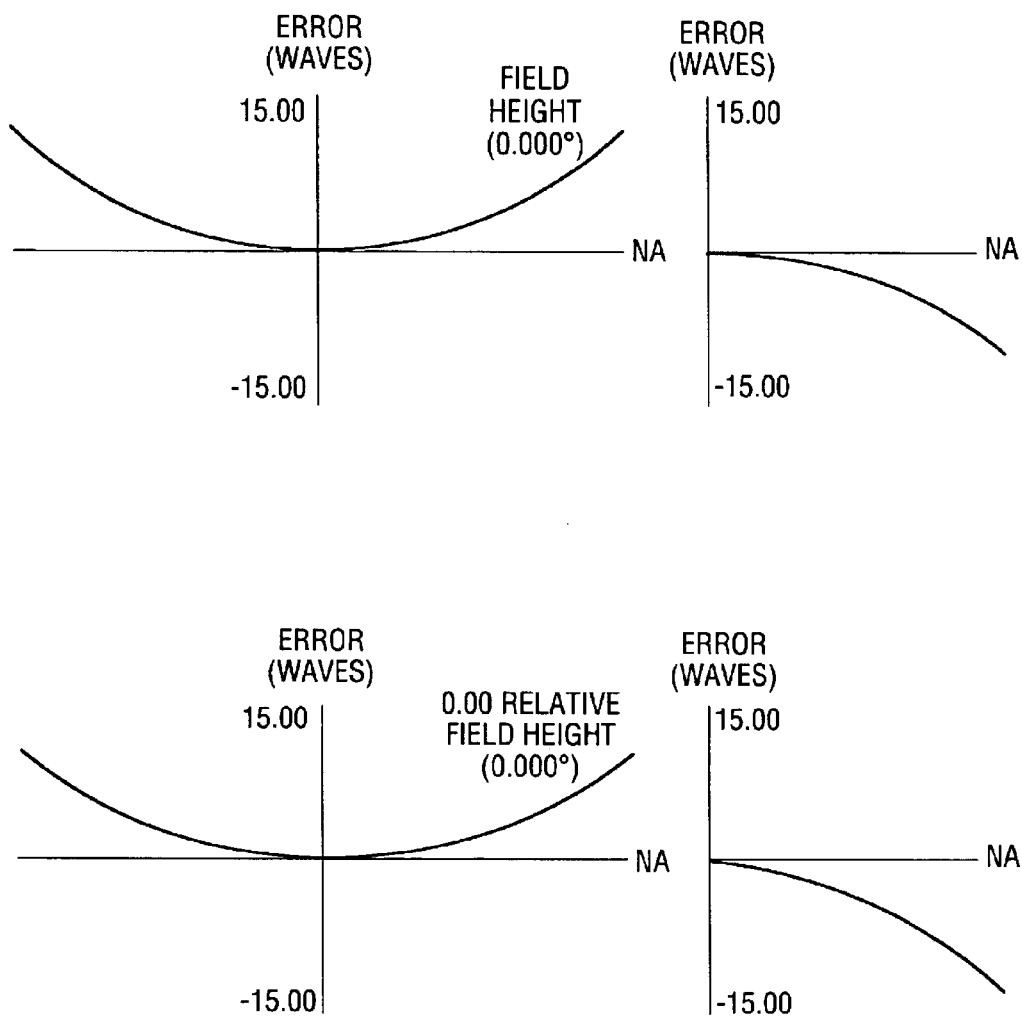
FIG. 4 shows the wavefront error for the prior art spectrometer of FIG. 1.

FIG. 4 shows the simulated wavefront error for the Fastie Ebert spectrometer 40 illustrated in FIG. 1 plotting the predicted error in waves vs. relative numerical aperture. FIG. 4 includes 4 plots derived for an axial point in the y-z (lower left) and x-z (lower right) planes, and that for a 1 mm object in the y-z (upper left) and x-z (upper right) planes. The design has ~15 waves P-V of aberration and the spectrometer produces a focal spot ~230 $\mu$m diameter at the detector. The dominant residual aberrations are spherical aberration and astigmatism.

Figure 5:
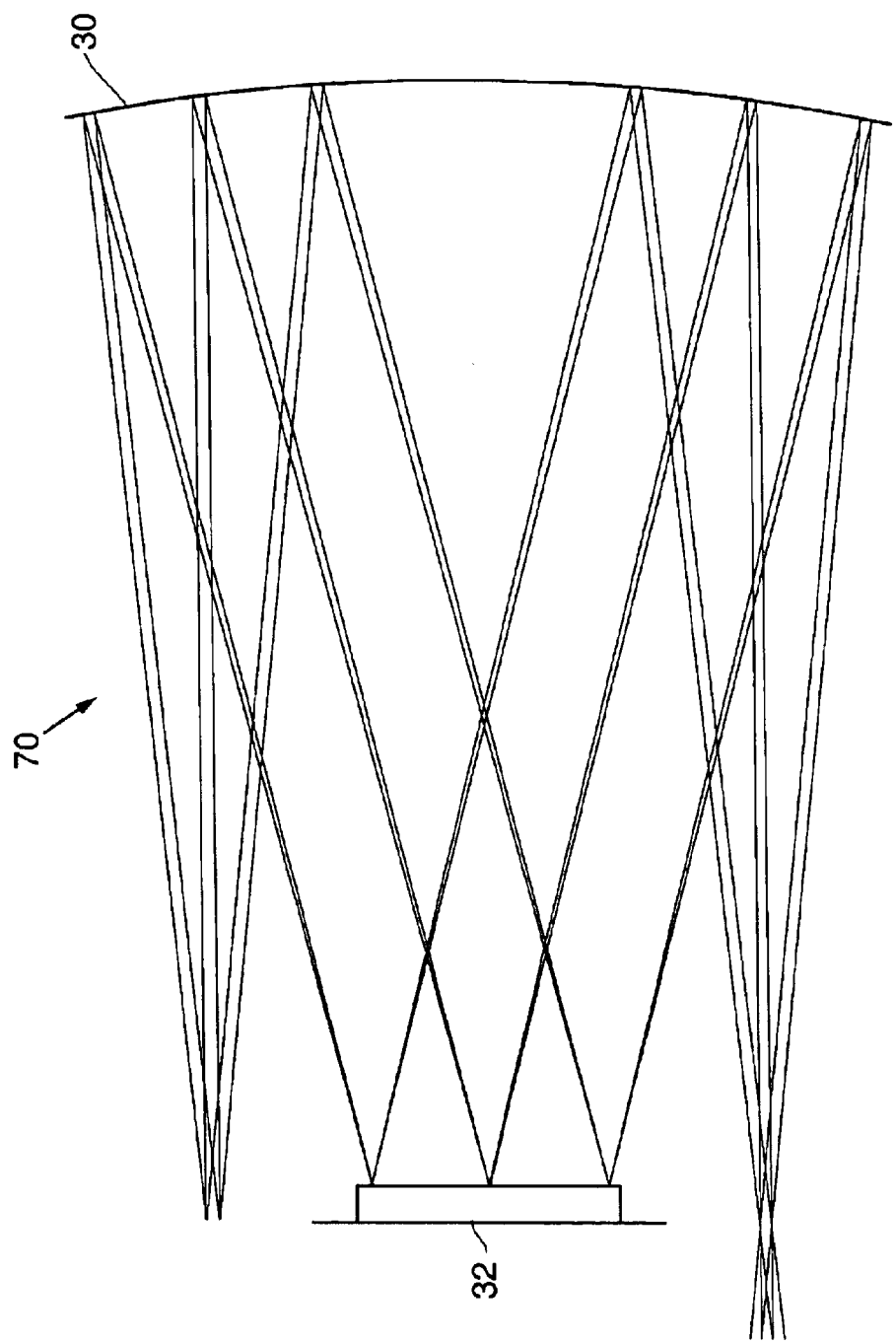
FIG. 5 is a diagram of a preferred embodiment of the compact imaging spectrometer employing an axial rotationally symmetric parabolic mirror.

FIG. 5 is a detailed view of one preferred embodiment of the compact imaging spectrometer 70. The design differs from the Fastie-Ebert prior-art design 40 of FIG. 1 in that a parabolic mirror is substituted for the spherical mirror. Alternatively, a conic section or torroidal mirror could be substituted for the parabolic mirror. Use of an aspheric reflector permits minimization of the spherical aberration. In this embodiment, the conic constant is, or the generalized aspheric coefficients of the reflective surface are, selected to balance spherical aberration. In the preferred embodiment the optical system is pupil centric and, by symmetry, has no coma or image distortion. In practical terms this implies an arrangement where the grating is located at the center of curvature of the parabolic mirror, and the system aperture stop (or an image of the system aperture stop) is in conjugate with the grating. Consequently, as illustrated in FIG. 6 the wavefront error may be markedly reduced.

Figure 6:
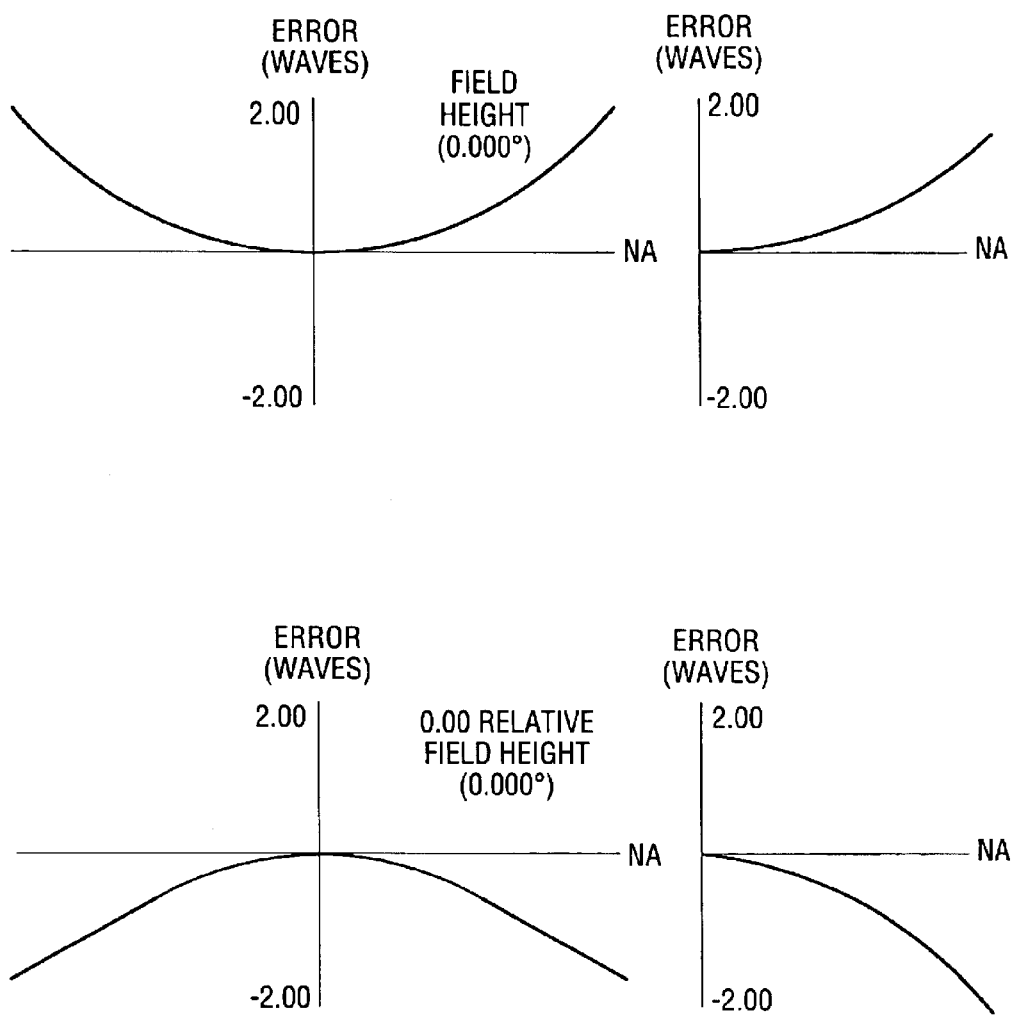
FIG. 6 illustrates the wavefront error for the spectrometer in FIG. 5.

FIG. 6 shows the simulated wavefront error for the spectrometer design 70 illustrated in FIG. 5 plotting the predicted error in waves vs. relative numerical aperture for both axial points and extended objects. FIG. 6 includes 4 plots derived for an axial point in the y-z (lower left) and x-z (lower right) planes, and that for a 1 mm object in the y-z (upper left) and x-z (upper right) planes. The substitution of a rotationally symmetric parabolic mirror for the spherical reflector significantly reduces spherical aberration; further, the use of a pupil centric design eliminates coma. The residual aberration of the design is reduced to ~2 waves P-V of aberration and the spectrometer has a focal spot ~35 $\mu$m diameter at the detector. This represents a significant improvement in performance as compared to the Fastie-Ebert spectrometer (compare to FIG. 4). The dominant residual aberration is astigmatism.

In the design 70 of FIG. 5, the diffracted illumination bundle is collimated upon reflection from the parabolic mirror and is therefore also collimated at the detector surface. Therefore, the detector can be positioned slightly off focus without impacting the size or the intensity of the detected illumination bundle. One can, therefore, compensate for astigmatism (e.g. the differences in focus for horizontal and vertical objects) by tilting the detector plane. A preferred embodiment 80 is illustrated in FIG. 7.

In practice, the tilt angle is easily determined by optimizing system spot sizes within any commercially available optical design software package. The residual wavefront error after optimization is illustrated in FIG. 8.

Figure 7:
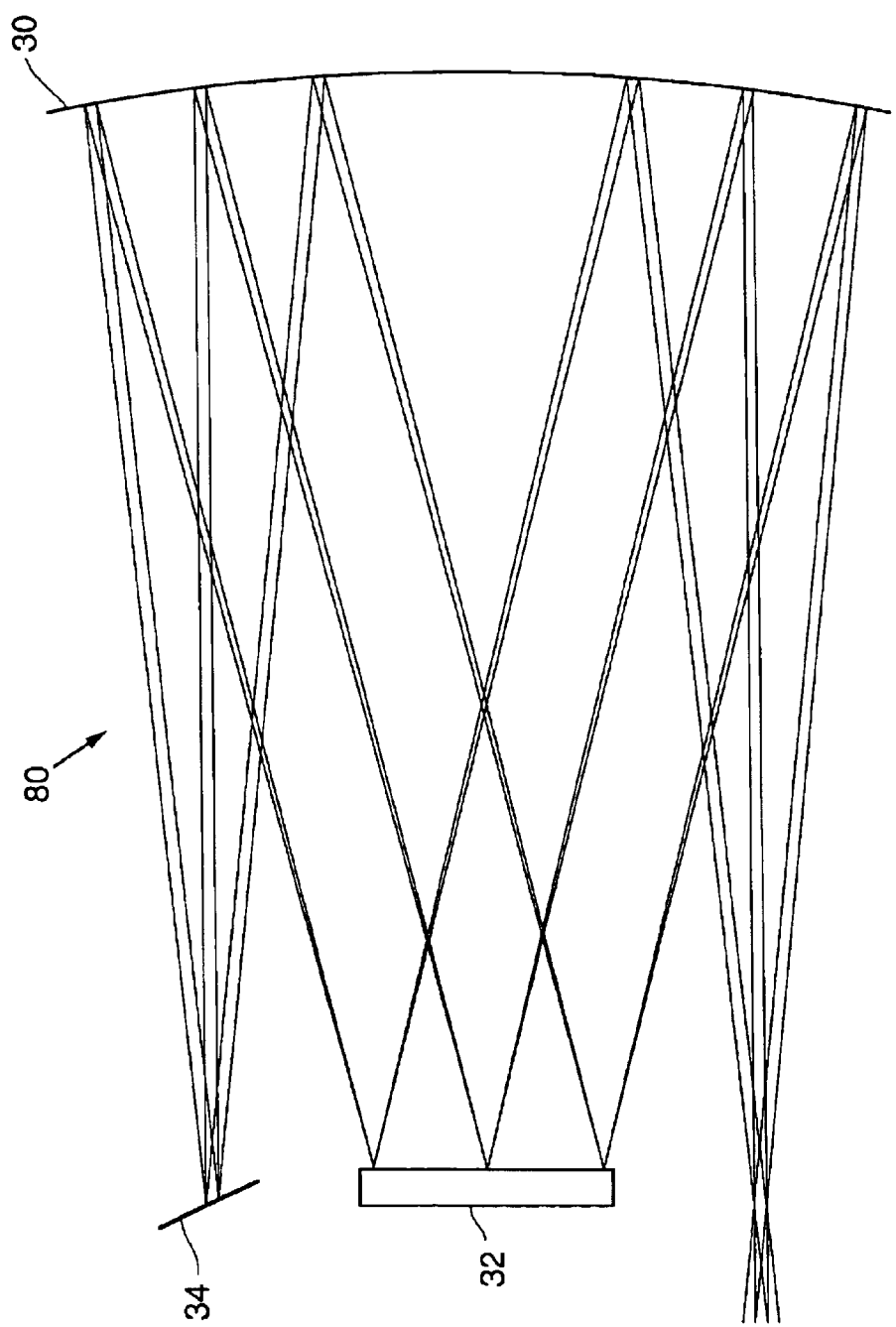
FIG. 7 illustrates an alternative preferred embodiment employing a rotationally symmetric parabolic mirror and a rotated detector plane.
Figure 8:
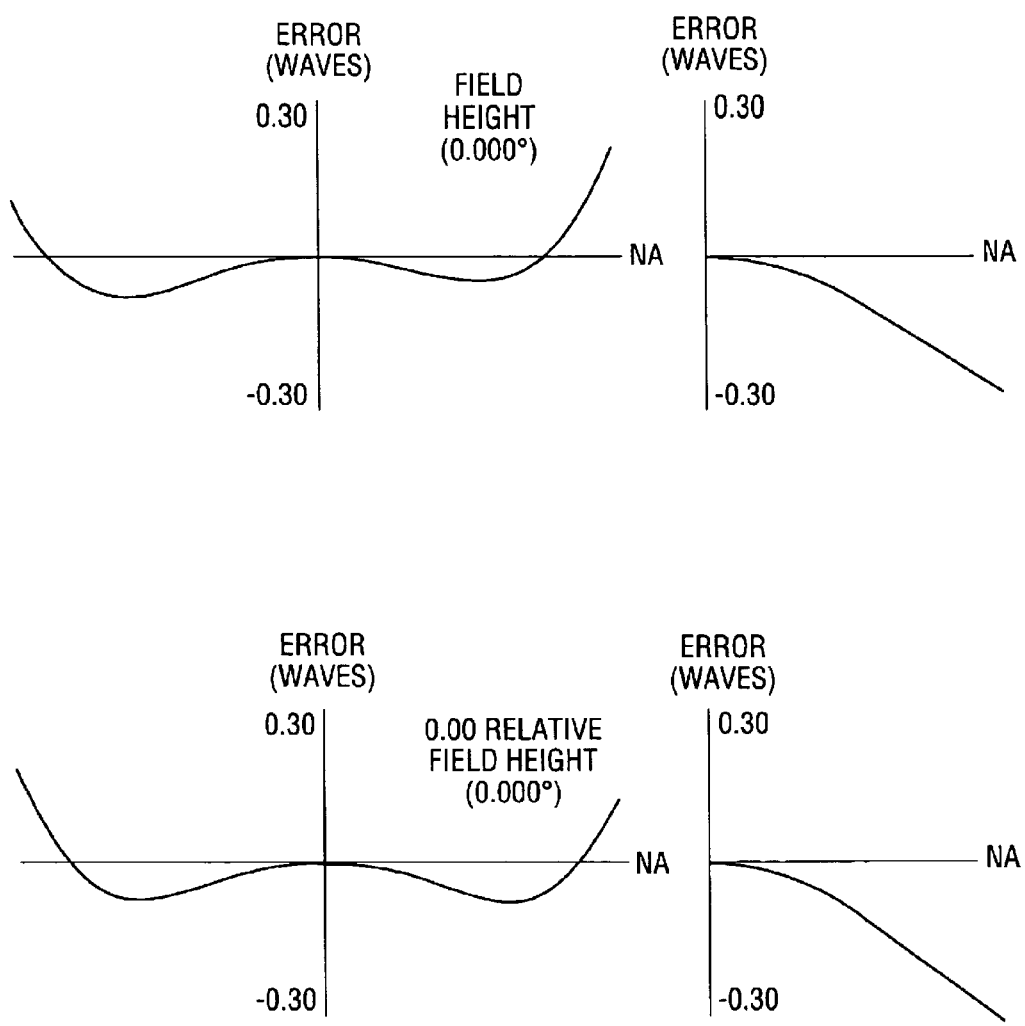
FIG. 8 shows the wavefront error for the arrangement of FIG. 7.

FIG. 8 shows the simulated wavefront error for the spectrometer design 80 illustrated in FIG. 7 plotting the predicted error in waves vs. relative numerical aperture for both axial points and extended objects. FIG. 8 includes 4 plots derived for an axial point in the y-z (lower left) and x-z (lower right) planes, and that for a 1 mm object in the y-z (upper left) and x-z (upper right) planes. In this simulation, the plane of the detector is tilted by an angle of 26 degrees as compared to the arrangement of FIG. 5. Tilting of the detector significantly reduces residual astigmatism. The residual aberration of the design is reduced to ~0.3 waves of aberration and the spectrometer produces a focal spot ~7 $\mu$m diameter at the detector. This represents a significant improvement in performance as compared to the previous designs (compare to FIG. 4 and FIG. 6).

In summary, prior-art spectrometers with a single mirror configuration typically experienced substantial spectral and spatial distortion, or error, attributable largely to the spectrometer geometry. The imaging spectrometer of the present invention circumvents many of these limitations and has the following beneficial characteristics:

(1) The spectrometer is capable of providing a spectral image having substantially reduced spatial and spectral distortion. The spectrometer can be scaled to any size, independent of its fore-optics, and dispersion requirements for a particular application.

(2) The spectrometer uses an axial rotationally symmetric aspheric concave mirror, e.g. a paraboloid, a torroid or a conic section, and therefore allows for mitigation of spherical aberration. This class of mirror is easy to manufacture, align, assemble and test and has lower sensitivity to manufacturing and assembly tolerance errors. Further, these mirrors can be fabricated using conventionally optical polishing techniques. Conventionally polished optics have reduced scatter as compared to diamond turned and replicated optics and reduced scatter improves the performance of the spectrometer for most measurement applications.

(3) The spectrometer employs a planar grating. Planar gratings are simpler to manufacture, align, assemble and test than curved gratings and can lead to more desirable grating efficiencies.

(4) The spectrometer optical system is pupil centric; therefore the system is less sensitive to defocus so astigmatism may be partially compensated by tilting the plane of the detector.

We claim:

1. A spectrometer for monitoring a polychromatic probe light beam associated with thin film metrology and general spectroscopic applications comprising:

an entrance aperture positioned to transmit a portion of the probe beam light;

a wavelength dispersive element for chromatically separating light;

a axially rotationally symmetric, aspheric mirror configured to reflect and collimate the transmitted portion of light onto the wavelength dispersive element and to collect and focus at least a portion of the chromatically separated light after interaction with the wavelength dispersive element; and a detector array positioned to receive the chromatically separated light reflected from the mirror and generating output signals corresponding to the intensity of the chromatically separated light as a function of wavelength.

2. The spectrometer of claim 1, where the wavelength dispersive element is a planar diffraction grating.

3. The spectrometer of claim 1, where the wavelength dispersive element is a prism.

4. The spectrometer of claim 1, where the rotationally symmetric aspheric mirror is a paraboloid.

5. The spectrometer of claim 1, where the rotationally symmetric aspheric mirror is selected from the group consisting of conic sections and toric surfaces.

6. The spectrometer of one of claims 1–5, wherein the aspheric departure of the rotationally symmetric aspheric mirror is selected to mitigate spherical aberration of the spectrometer.

7. The spectrometer of claim 6, further including locating the spectrometer aperture stop conjugate with the wavelength dispersive element, said arrangement further including locating the wavelength dispersive element at the center of curvature of the aspheric mirror, resulting in a pupil centric optical system thereby minimizing coma and image distortion.

8. The spectrometer of claim 7, wherein a plane of the detector array is tilted to minimize residual astigmatism.

9. The spectrometer of one of claims 1 to 5 incorporated within one or more than one instrument selected from the group consisting of spectroscopic reflectometers, spectroscopic ellipsometers, polarized beam spectroscopic reflectometers, spectroscopic scatterometers and optical CD metrology tools.

10. The spectrometer of claim 1, further including a processor for evaluating the output signals generated by the detector array.

11. An apparatus for evaluating a sample comprising:
 a light source for generating a polychromatic probe beam which is directed to interact with the sample;
 a spectrometer for monitoring the probe beam after interaction with the sample, said spectrometer including:
  an entrance aperture positioned to transmit a portion of the probe beam light;
  a wavelength dispersive element for chromatically separating light;
  an axially rotationally symmetric, aspheric mirror configured to reflect and collimate the transmitted portion of light onto the wavelength dispersive element and to collect and focus at least a portion of the chromatically separated light after interaction with the wavelength dispersive element; and
  a detector array positioned to receive chromatically separated light reflected from the mirror and generating output signals corresponding to the intensity of the chromatically separated light as a function of wavelength; and a processor for evaluating the sample based on the output signals from the detector array.

12. The apparatus of claim 11 where the wavelength dispersive element is a planar diffraction grating.

13. The apparatus of claim 11 where the rotationally symmetric aspheric mirror is a paraboloid.

14. The apparatus of claim 11 where the rotationally symmetric aspheric mirror is selected from the group consisting of conic sections and toric surfaces.

15. The apparatus of claim 11 further including locating the spectrometer aperture stop conjugate with the wavelength dispersive element, said arrangement further including locating the wavelength dispersive element at the center of curvature of the aspheric mirror, resulting in a pupil centric optical system thereby minimizing coma and image distortion.

16. The apparatus of claim 11 wherein a plane of the detector array is tilted to minimize residual astigmatism.

17. The apparatus of claim 11 configured to operate as in instrument selected from the group consisting of spectroscopic reflectometers, spectroscopic ellipsometers, polarized beam spectroscopic reflectometers, spectroscopic scatterometers and optical CD metrology tools.

* * * * *